(12) United States Patent
Kurata et al.

(10) Patent No.: US 6,388,774 B1
(45) Date of Patent: May 14, 2002

(54) IMAGE READING APPARATUS

(75) Inventors: Tetsuji Kurata; Shoji Kikuchi, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/137,191

(22) Filed: Aug. 20, 1998

(30) Foreign Application Priority Data

Aug. 22, 1997 (JP) .......................................... 09-240254
Aug. 19, 1998 (JP) .......................................... 10-247747

(51) Int. Cl.$^7$ ................................................ H04N 1/04
(52) U.S. Cl. ........................ 358/474; 358/475; 358/468
(58) Field of Search ................................ 358/475, 474, 358/471, 314, 312; 235/462, 472, 473

(56) References Cited

U.S. PATENT DOCUMENTS

| | | | | |
|---|---|---|---|---|
| 3,708,232 A | * | 1/1973 | Walsh | 356/172 |
| 4,674,834 A | * | 6/1987 | Margolin | 350/96.25 |
| 4,748,680 A | * | 5/1988 | Margolin | 382/65 |
| 4,810,096 A | | 3/1989 | Russell et al. | 356/436 |
| 5,021,877 A | * | 6/1991 | Tsuchiya | 358/75 |
| 5,315,346 A | * | 5/1994 | Graebe | 355/1 |
| 5,483,831 A | * | 1/1996 | Steiner | 73/313 |
| 5,689,104 A | * | 11/1997 | Suzuki | 235/472 |
| 5,742,715 A | * | 4/1998 | Boehlke | 385/32 |
| 5,992,746 A | * | 11/1999 | Suzuki | 235/462.21 |
| 6,075,240 A | * | 6/2000 | Watanabe | 250/234 |

FOREIGN PATENT DOCUMENTS

| | | | |
|---|---|---|---|
| DE | 28 01 765 | 7/1979 | |
| JP | 403286223 A | * 12/1991 | ............. G06F/3/14 |

OTHER PUBLICATIONS

Patent Abstracts of Japan JP 01 173969 A, vol. 013, No. 450, published Jul. 10, 1989.
Patent Abstracts of Japan JP 03 035260 A, vol. 015, No. 169, published Feb. 15,1991.

* cited by examiner

Primary Examiner—Jerome Grant, II
(74) Attorney, Agent, or Firm—Robin, Blecker & Daley

(57) ABSTRACT

A serial-scanning-type image reading apparatus includes a plurality of light guides. One end of each of the light guides is connected to a supporting plate provided for supporting an original thereon at a position a constant distance apart from a scanner head. The connecting position of each light guide to the supporting plate is in a region within a range in which the scanner head is movable but out of a region in which the original is transported. Each light guide extends from the connecting position to an exterior part of the apparatus. One of the plurality of light guides is selected depending on the operating status of the apparatus, and the scanner head is positioned so that light emitted from a light source is guided through the selected light guide to the exterior part of the apparatus. Thus, it is possible to provide a low-cost indicator for indicating the operating status of the image reading apparatus while maintaining the scanning element and the scanning region covered by a cover.

14 Claims, 12 Drawing Sheets

IMAGE READING APPARATUS

BACKGROUND OF THE INVENTION

1. Field of the Invention

The present invention relates to an image reading apparatus for reading an image recorded on an original by optically scanning the original.

2. Description of Related Art

In a conventional serial-scanning-type (light-illumination-type) image reading apparatus (hereinafter also referred to simply as a scanner), a carriage on which a scanner head is mounted is moved back and forth across an original which is intermittently transported by a paper transport device, so that an image recorded on the original is scanned and read by the scanner head. Therefore, a portion of the image reading apparatus where the scanner head performs a scanning and reading operation is protected by a cover so as to prevent the user from accidentally touching the carriage or the original during the scanning operation and to prevent ambient light from entering the scanning portion and hindering the reading operation.

However, the provision of such cover makes it impossible for the user to watch the scanning operation. That is, the user cannot know through a visual observation whether the apparatus is in operation or the operation is complete, and cannot notice an occurrence of an error during the scanning operation. To avoid such an inconvenience, there is provided an LCD (liquid crystal display) panel or a plurality of LEDs (light emitting diodes) for indicating the status of the scanning operation of the apparatus, so that the user can confirm the status of the apparatus with the cover kept covering the scanning and reading portion.

Further, in recent years, a combined-function apparatus in which an image reading function and a printing function are combined has been realized (as disclosed in, for example, Japanese Patent Publications No. Hei 1-20832, No. Hei 2-21711 and No. Hei 2-21712). In such a combined-function apparatus, while a single paper transport system is used in common, either a printing head or a scanner head is mounted on a single carriage in an exchangeable fashion. Therefore, it is desired that the combined-function apparatus have the capability of indicating which of the two types of heads, i.e., the printing head and the scanner head, is mounted on the carriage at present.

Further, in the case of a line-scanning-type (light-illumination-type) image reading apparatus, as shown in FIG. 14, there is used, as illumination means for radiating light onto the surface of an original, a fluorescent lamp 95 having a length sufficiently large to illuminate the original over its entire reading width (width of the original in a direction perpendicular to the paper of FIG. 14). In FIG. 14, reference numeral 94 denotes a condensing lens for condensing the light reflected from the original 50 illuminated by the fluorescent lamp 95 onto an image sensor 93. The image sensor 93 is constructed with a photoelectric conversion element such as a CCD or a photodiode.

However, the provision of such an LCD panel or a plurality of LEDs results in an increase in the number of components, such a substrate, parts of the LED or LCD panel, and thus results in an increase in cost. Although the cost may be reduced by employing a small number of display devices such as LEDs, it is required to indicate information by means of on/off combinations or blinking patterns of the reduced number of LEDs. Such a display method is not easy for users to understand.

Furthermore, the employment of the fluorescent lamp as the illumination means (light source) results in various problems. More specifically, electrodes disposed at both ends of the illumination means do not make any contribution to emission of light. Furthermore, a special power supply for supplying electric power to the fluorescent lamp is required, so that the total size of the light source becomes large, and large electric power is consumed.

BRIEF SUMMARY OF THE INVENTION

It is an object of the present invention to make it possible to indicate the status of an image reading apparatus with a simple structure.

It is another object of the present invention to provide a smaller-sized light source which consumes less electric power.

According to an aspect of the present invention, there is provided an image reading apparatus which comprises a light source for illuminating an original, reading means for reading light from the original illuminated by the light source, and an indication part for indicating an operating status of the apparatus by using illumination light emitted from the light source. This allows the operating status of the image reading apparatus to be indicated using a simple mechanism.

According to another aspect of the present invention, there is provided an image reading apparatus which comprises light radiating means for radiating light simultaneously over an entire width direction of an original, which direction is perpendicular to a direction in which to transport the original, and photoelectric conversion means for photoelectrically converting light reflected from the original illuminated by the light radiating means into an image signal and for outputting the image signal, wherein the light radiating means comprises a plurality of light emitting element groups, each group being composed of three kinds of light emitting elements for emitting light with three primary colors, the plurality of light emitting element groups being arranged along the width direction of the original perpendicular to the direction in which to transport the original, and wherein the light radiating means further comprises an optical waveguide for guiding light emitted from each of the light emitting elements to the original in such a manner that the three kinds of light emitting elements produce the same illumination field on the original. Thus, it becomes possible to realize a small-sized light source which consumes less electric power.

These and other objects, features, and advantages of the present invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

(First Embodiment)

Figure 1:
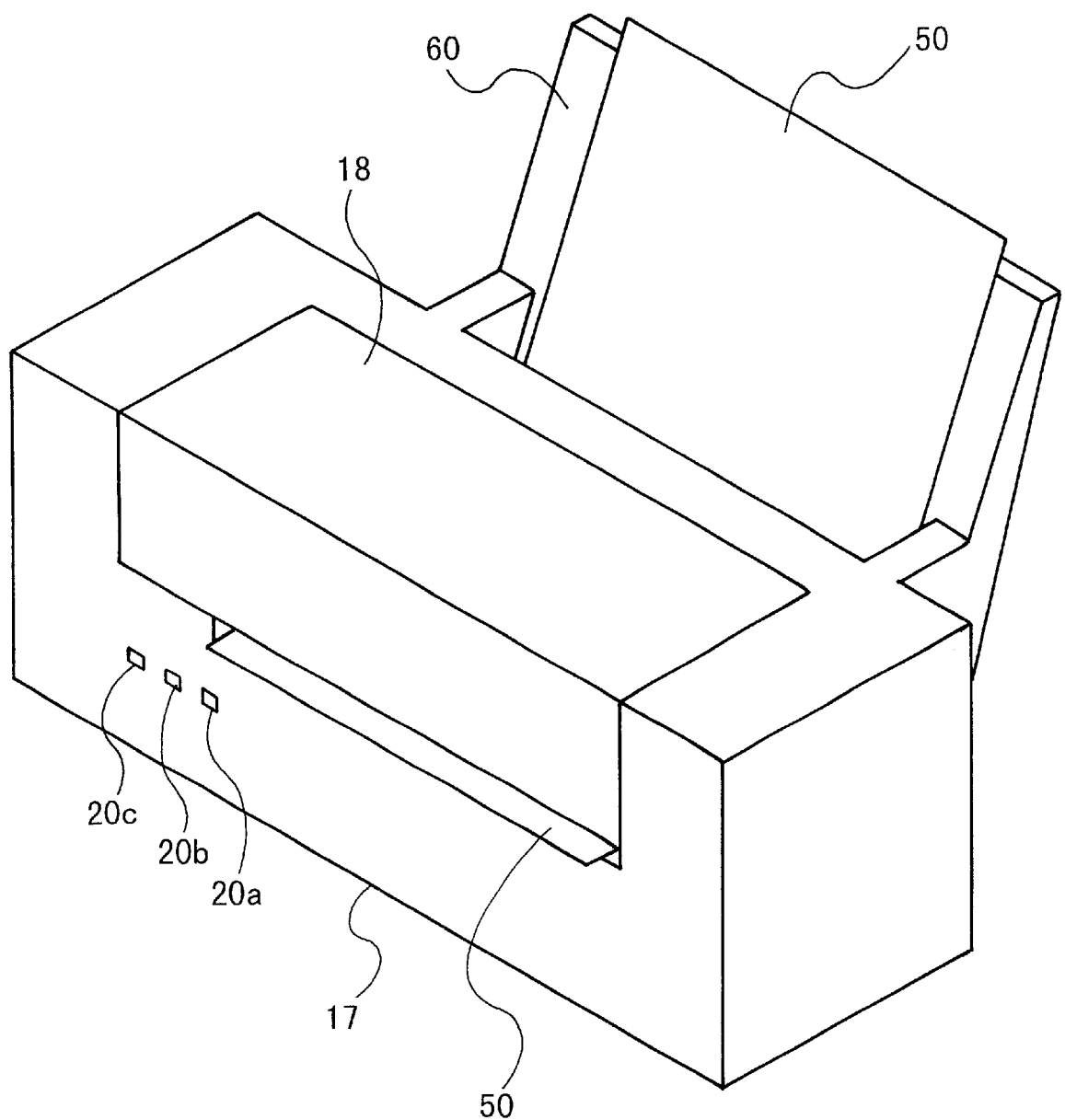
FIG. 1 is a perspective view illustrating the outer structure of an image reading apparatus according to a first embodiment of the invention.
Figure 2:
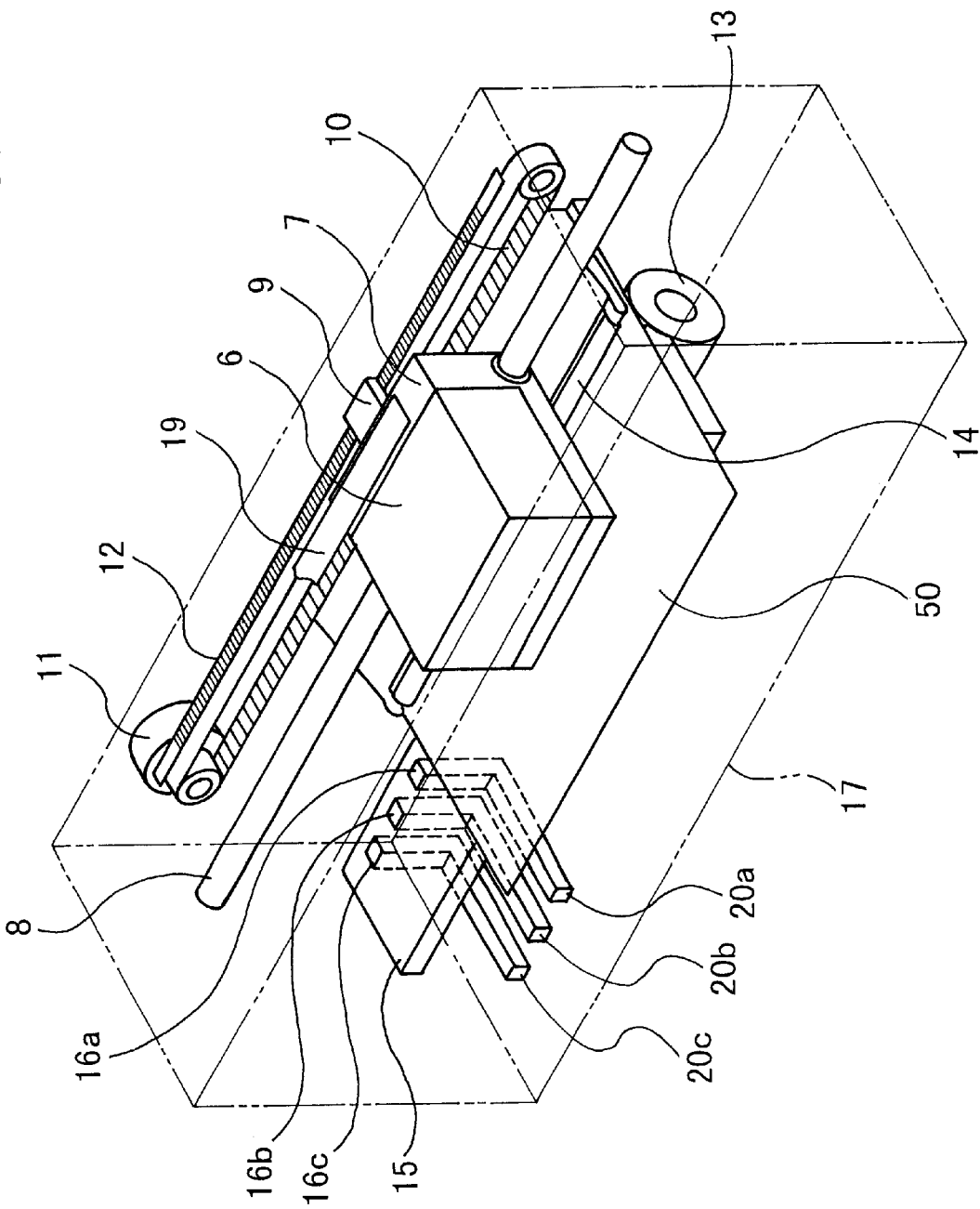
FIG. 2 is a perspective view illustrating the inner structure of the image reading apparatus according to the first embodiment of the invention.
Figure 3:
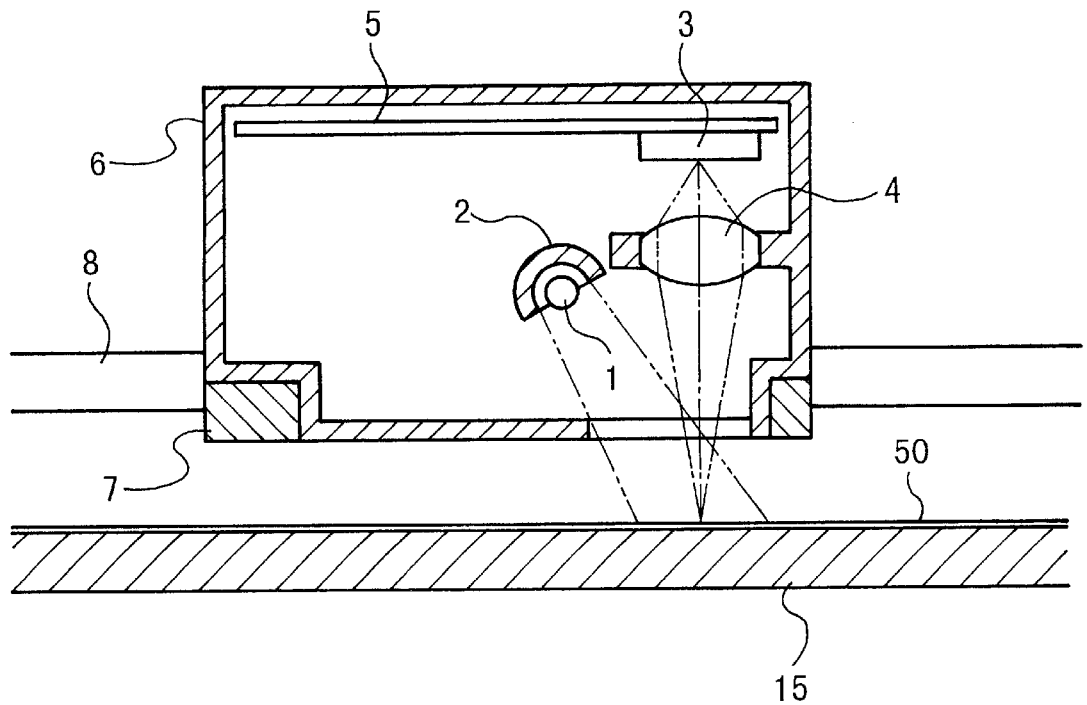
FIG. 3 is a cross-sectional view of a scanner head provided in the image reading apparatus according to the first embodiment.

FIGS. 1 and 2 are perspective views illustrating the outer and inner structures, respectively, of an image reading apparatus according to a first embodiment of the invention. FIG. 3 is a cross-sectional view of a scanner head provided in the image reading apparatus.

First, the scanner head is described with reference to FIG. 3. As shown in FIG. 3, the scanner head 6 is composed of a light source 1 for illuminating an original 50 with light, a reflecting plate 2 for uniformly illuminating the original 50 with the light emitted from the light source 1, an image sensor 3 for reading an image recorded on the original 50, a lens 4 for condensing the light reflected from the original 50 onto the image sensor 3, and other elements. The image sensor 3 is constructed with a photoelectric conversion element such as a CCD or a photodiode. An image signal produced by the image sensor 3 by means of photoelectric conversion is read out by a reading control circuit (not shown) provided on a circuit board 5, and is then transferred to the body of the image reading apparatus via a flexible cable 19 (refer to FIG. 2). In the first embodiment, the carriage 7 is adapted such that either the scanner head 6 or a printing head (not shown) is mounted on the carriage 7 in an exchangeable fashion. To allow both the scanner head 6 and the printing head to use the same flexible cable 19, the carriage 7 has contacts (not shown) for electrically connecting the flexible cable 19 to the scanner head 6 or the printing head.

Referring now to FIGS. 1 and 2, the body of the image reading apparatus having the scanner head 6 mounted thereon is described below.

The original 50 is fed into the body of the image reading apparatus from a document feeder 60 located at the back of the body, and is then intermittently transported while being pinched between a transport roller 13 and a pinch roller 14. The carriage 7, on which the scanner head 6 (or the printing head) is mounted, is driven by a carriage motor 11 so as to be moved back and forth along a guide shaft 8. That is, in association with the intermittent transporting motion of the original 50, the carriage 7 is moved alternately back and forth in a direction perpendicular to the direction in which to transport the original 50, and thus, during the back and forth movement of the carriage 7, the original 50 is scanned by the scanner head 6.

A supporting plate 15, which is disposed in the middle of the original transporting path in the body of the image reading apparatus, is arranged to support the original 50 while maintaining the original 50 a constant distance apart from the scanner head 6. The supporting plate 15 is provided with a plurality of equally spaced holes 16a, 16b and 16c, which are formed at locations opposed to the light source 1 of the scanner head 6 and in an area within the range in which the carriage 7 is movable but outside the area on which the original 50 is transported. One end of each of L-shaped light guides 20a, 20b and 20c serving as an optical path for propagating the light emitted from the light source 1 is inserted into a corresponding one of the holes 16a, 16b and 16c. The light guides 20a, 20b and 20c are apart from each other by a sufficient distance so that when one light guide is illuminated with the light emitted from the light source 1, light leaking from that light guide is prevented from entering another light guide. As shown in FIG. 1, the light guides 20a, 20b and 20c extend to the outer surface of an exterior part 17 of the body of the image reading apparatus. In such a structure, one of the light guides 20a, 20b and 20c is selected depending on the operation status, and the light emitted from the light source 1 of the scanner head 6 is guided through the selected light guide to the outside, thereby providing a lighting-up indication, so that the user can recognize the status of the apparatus while maintaining the scanning element such as the scanner head 6 and the scanning region covered with a cover 18.

Figure 4:
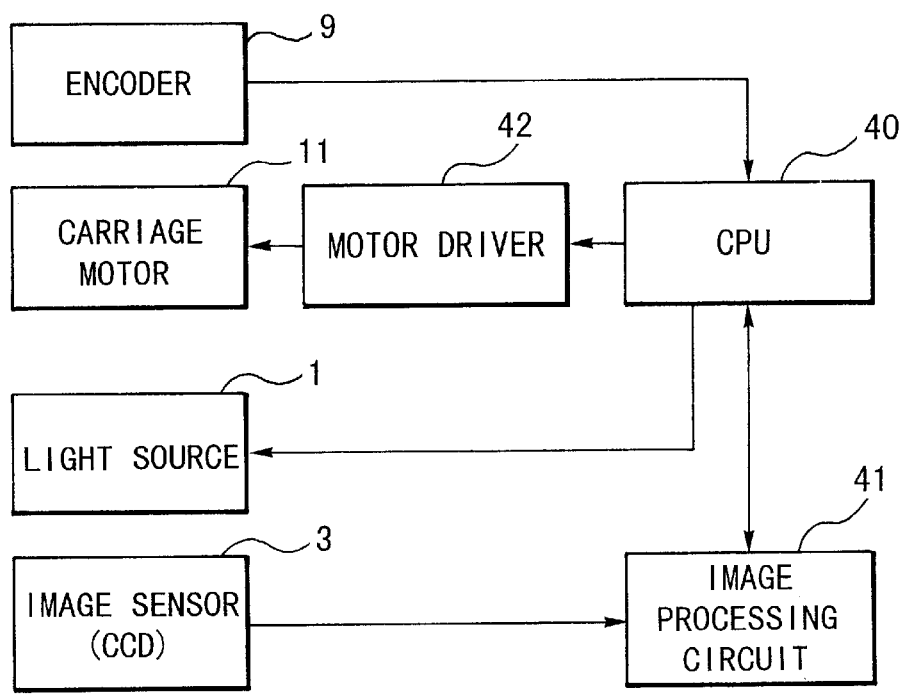
FIG. 4 is a block diagram illustrating the electrical configuration of the image reading apparatus according to the first and second embodiments of the invention.

FIG. 4 is a block diagram illustrating the electrical configuration of the image reading apparatus. As shown in FIG. 4, the image reading apparatus has a CPU 40 responsible for the control over the entire apparatus. The CPU 40 controls the operation of turning on/off the light source 1 and also controls an image processing circuit 41 to perform various operations on the image data read out by the image sensor 3. Further, in accordance with the signal indicating the position of the carriage 7 detected by an encoder 9, the CPU 40 controls a motor driver 42 to drive a carriage motor 11 so that a desired one of the light guides 20a, 20b and 20c is illuminated with the light emitted from the light source 1 of the scanner head 6.

Figure 5:
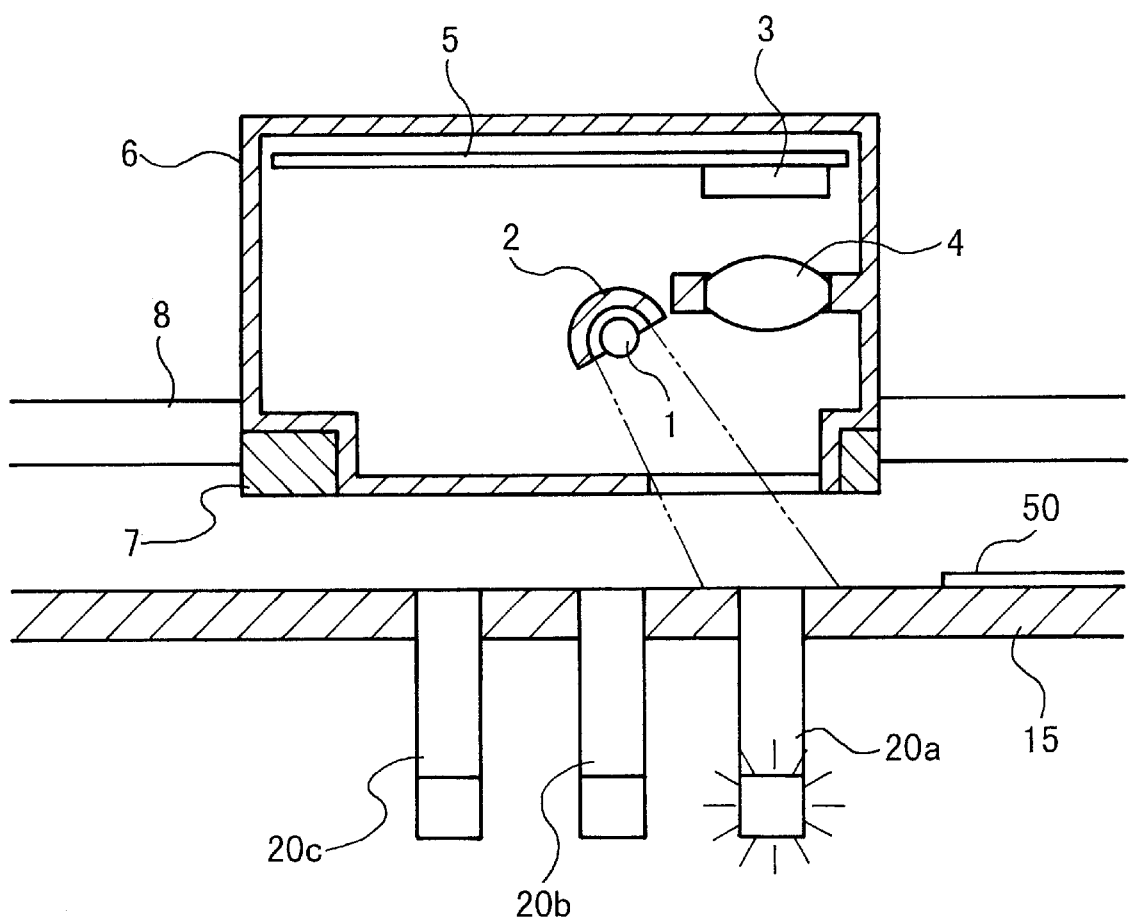
FIG. 5 is a schematic diagram illustrating the operation of indicating the status of the image reading apparatus according to the first embodiment.

For example, when the apparatus is in a status ready for a scanning and reading operation, the carriage 7 is positioned at a location which causes the light guide 20a to be illuminated so that the external end of the light guide 20a is illuminated, as shown in FIG. 5, thereby indicating to the outside of the apparatus body that the scanner head 6 is mounted on the carriage 7 to make the apparatus ready for the scanning and reading operation. At the time of completion of the scanning and reading operation, the carriage 7 is positioned at a location which causes the light guide 20b to be illuminated so that the external end of the light guide 20b is illuminated, thereby indicating to the outside of the apparatus body that the scanning and reading operation has been completed. Further, at the time of occurrence of an error, the carriage 7 is positioned at a location which causes the light guide 20c to be illuminated so that the external end of the light guide 20c is illuminated, thereby indicating to the outside of the apparatus body that the error has occurred.

In addition, by expanding a range in which the carriage 7 is moved back and forth during the scanning and reading operation up to the location of the light guide 20a and intermittently illuminating the light guide 20a during the scanning operation, it is possible to indicate that the apparatus is in process of the scanning and reading operation. Further, in a case where the printing head is mounted on the carriage 7 instead of the scanner head 6, none of the light guides 20a, 20b and 20c is illuminated, so that the user can recognize that a head mounted on the carriage 7 at present is the printing head. Thus, it is possible to indicate which of the scanner head 6 and the printing head is mounted on the carriage 7.

(Second Embodiment)

Figure 6:
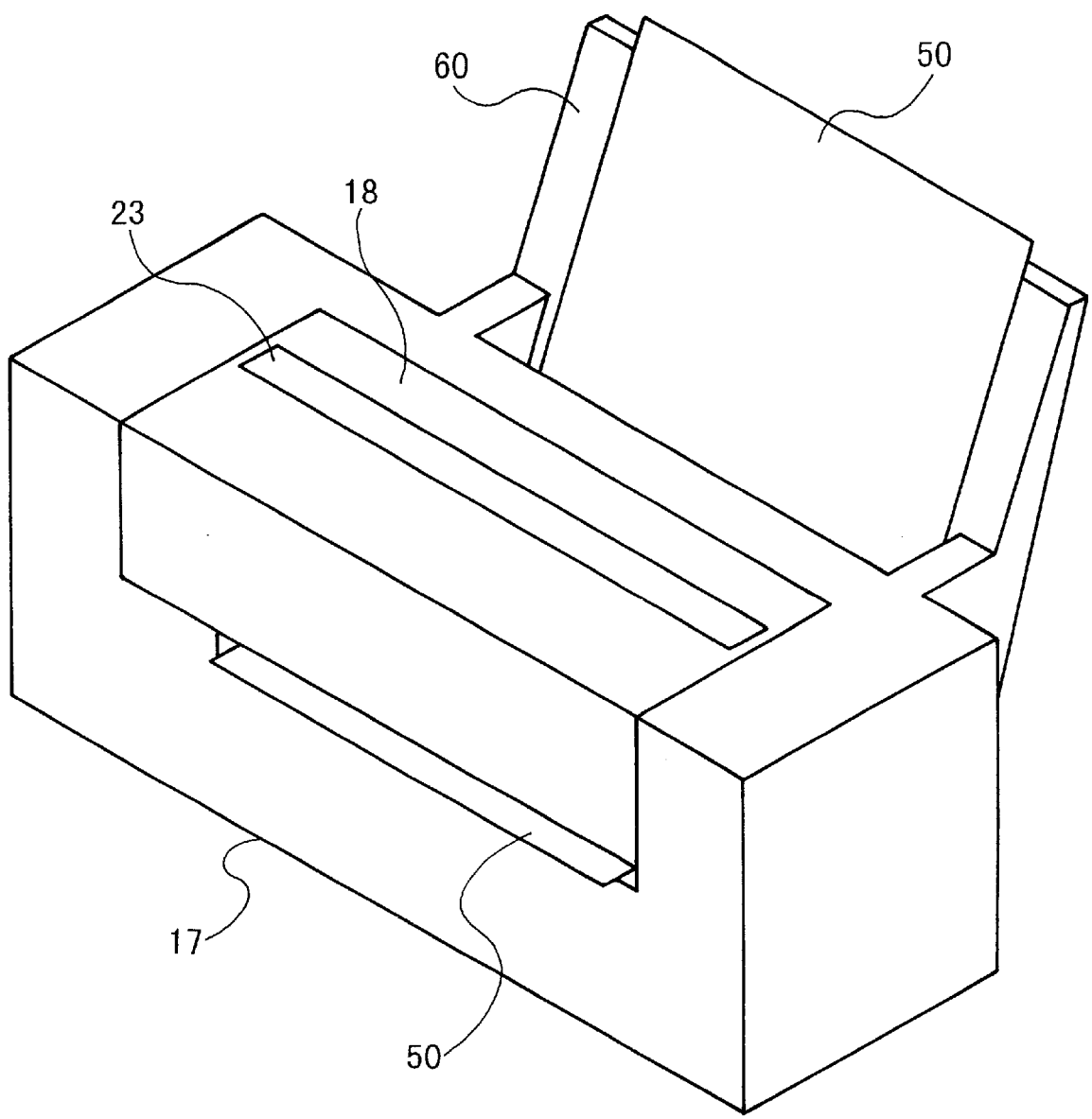
FIG. 6 is a perspective view illustrating the outer structure of an image reading apparatus according to the second embodiment of the invention.
Figure 7:
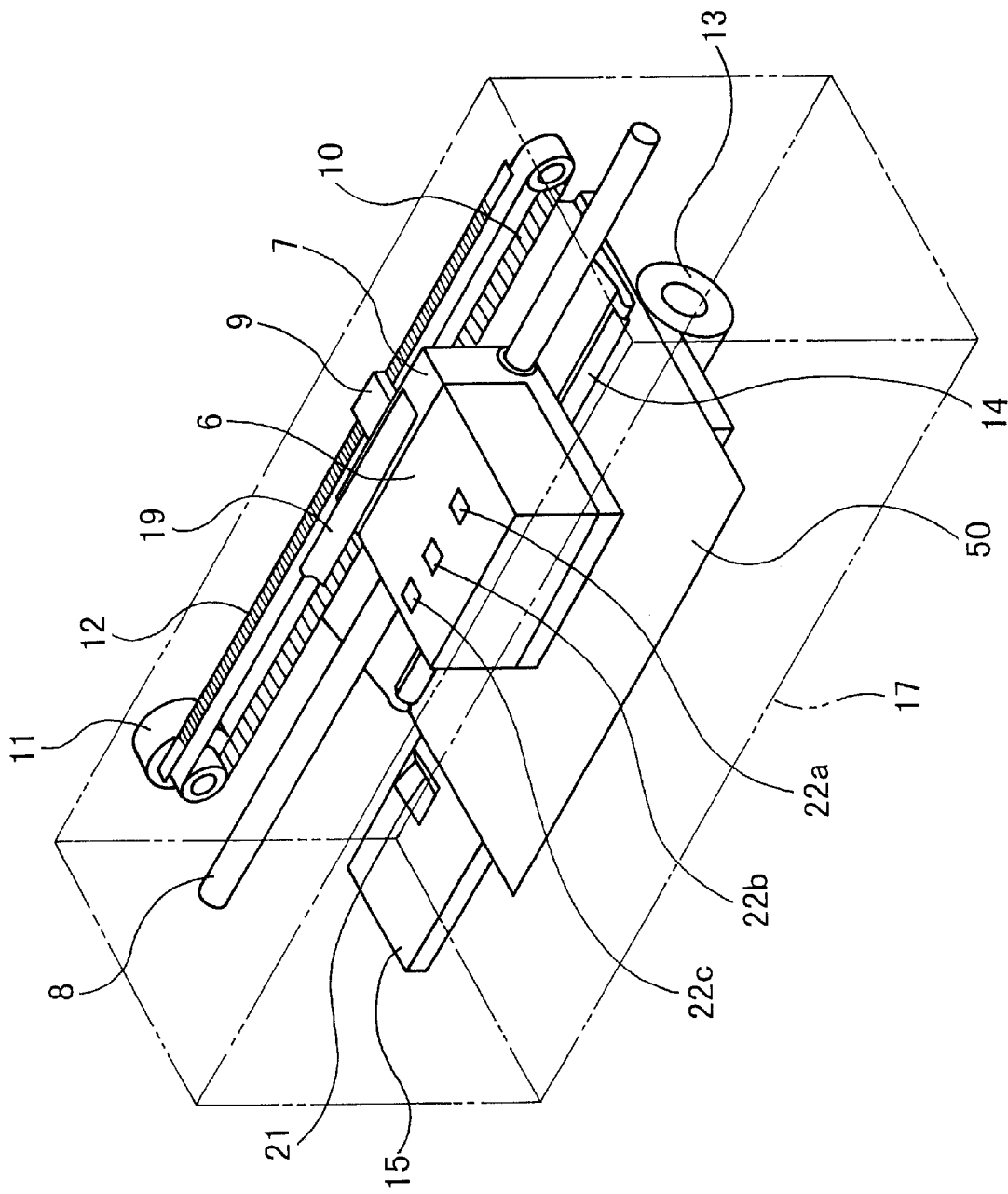
FIG. 7 is a perspective view illustrating the inner structure of the image reading apparatus according to the second embodiment of the invention.
Figure 8:
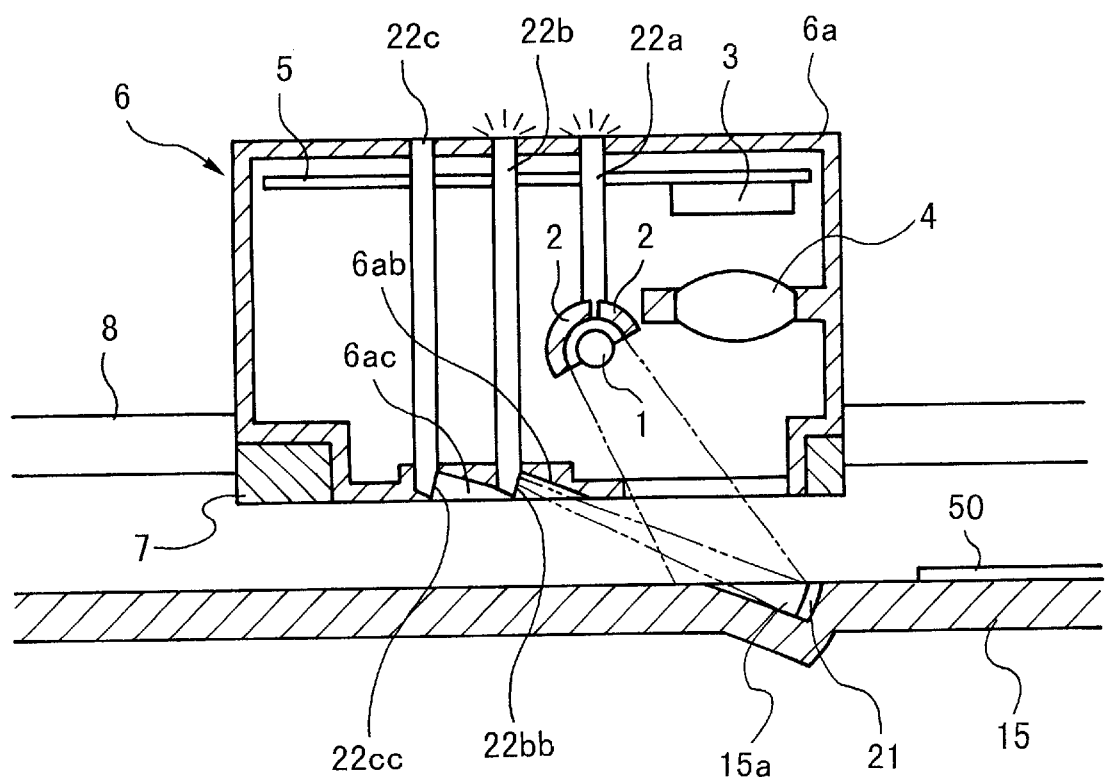
FIG. 8 is a cross-sectional view of a scanner head provided in the image reading apparatus according to the second embodiment.

FIGS. 6 and 7 are perspective views illustrating the outer and inner structures, respectively, of an image reading apparatus according to a second embodiment of the invention. FIG. 8 is a cross-sectional view of a scanner head provided in the image reading apparatus.

Many of constituent elements of the second embodiment are similar to those used in the first embodiment, and these similar elements are denoted by similar reference numerals. Thus, the following description is mainly concerned with elements which are different from those employed in the first embodiment.

In the first embodiment described above, there are provided the L-shaped light guides 20a, 20b and 20c extending from the locations within the range in which the carriage 7 is movable and outside the range on which the original 50 is transported on the supporting plate 15 to the outer surface of the exterior part 17 of the body of the image reading apparatus. In the second embodiment, in contrast, there is provided a first light guide 22a extending linearly between the back surface, on the side opposite to the original 50, of the reflecting plate 2 for uniformly illuminating the original 50 with the light emitted from the light source 1 and the upper surface of a casing 6a of the scanner head 6. There are also provided second light guides 22b and 22c extending linearly between the upper and lower surfaces of the casing 6a of the scanner head 6 (refer to FIG. 8).

Furthermore, a reflecting plate 21 for reflecting the light, which is emitted from the light source 1 to the surface of the original 50, toward one of the second light guides 22b and 22c is disposed on the supporting plate 15, at a location outside the range on which the original 50 is transported and within the range in which the carriage 7 is movable (refer to FIGS. 7 and 8). Incidentally, since the light is emitted from the light source 1 in an oblique direction to the surface of the original 50, the reflecting plate 21 is placed in a recessed part 15a which is formed in the supporting plate 15 at a predetermined angle of inclination (refer to FIG. 8). Further, tapered parts 22bb or 22cc parallel to the reflecting plate 21 are formed on the respective lower ends of the second light guides 22b and 22c, and the lower plate of the casing 6a of the scanner head 6 which supports the lower ends of the second. light guides 22b and 22c is provided with recessed parts 6ab and 6ac, which are partly recessed at a predetermined angle of inclination so that the light reflected from the reflecting plate 21 is made incident on the tapered parts 22bb and 22cc through the recessed parts 6ab and 6ac.

A window 23 made of an optically transparent material such as smoke glass is formed in the upper plate of the cover 18 at a location opposed to the first and second light guides 22a, 22b and 22c, so that the user can recognize, from the outside through the window 23, the lighting state of the first light guide 22a or the second light guide 22b or 22c. Incidentally, since the window 23 is formed to have a sufficiently narrow width, the indication of the lighting state of the light guide can be provided without allowing ambient light to hinder the scanning and reading operation.

As in the first embodiment, the first and second light guides 22a, 22b and 22c are apart from each other by a sufficient distance so that when one light guide is illuminated with the light emitted by the light source 1, light leaking from that light guide is prevented from entering another light guide.

In the second embodiment, when the apparatus is in a status ready for the scanning and ready operation, the light source 1 is turned on and off repeatedly so that the first light guide 22a is illuminated in a blinking manner, thereby indicating to the outside of the apparatus body that the scanner head 6 is mounted on the carriage 7 to make the apparatus ready for the scanning and reading operation. During the scanning and reading operation, the light source 1 is always in an on-state and thus the illuminated first light guide 22a moves within the area corresponding to the window 23, thereby indicating that the apparatus is in the process of the scanning and reading operation.

Further, at the time of completion of the scanning and reading operation, the carriage 7 is positioned at a location which causes the second light guide 22b to be illuminated with the light reflected from the reflecting plate 21, and the light guide 22b is illuminated, so that the user can recognize through the window 23 that the scanning and reading operation has been completed. On the other hand, at the time of occurrence of an error, the carriage 7 is positioned at a location which causes the light guide 22c to be illuminated with the light reflected from the reflecting plate 21, and the light guide 22c is illuminated, so that the user can recognize through the window 23 that the error has occurred.

In the first and second embodiments, as described above, there are provided a plurality of light guides for guiding the light emitted from the light source 1 to the exterior part of the apparatus body. One of the light guides is selected depending on the status of the apparatus, and the carriage, i.e., the scanner head, is positioned so that the selected light guide is illuminated by being illuminated by the light emitted from the light source 1. Thus, these light guides serve as an indicator which can be realized at a low cost and which makes it possible for the user to easily recognize the status of the image reading apparatus while maintaining the scanning element and the scanning region covered by the cover.

(Variations of First and Second Embodiments)

The above-described first and second embodiments of the present invention may be modified in various manners. For example, although in the first and second embodiments the light guides are assumed to be made of a colorless and optically transparent material such as an acrylic resin, the light guides may also be made of materials having different colors and they may be illuminated with monochromatic light emitted by a light source, thereby improving the recognizability. In addition, when the light source is adapted to illuminate color light including three primary colors RGB for use in a color scanner, the respective light guides may be made of either a colorless and optically transparent material or materials having different colors, so that a greater number of different colors may be represented.

Figure 9:
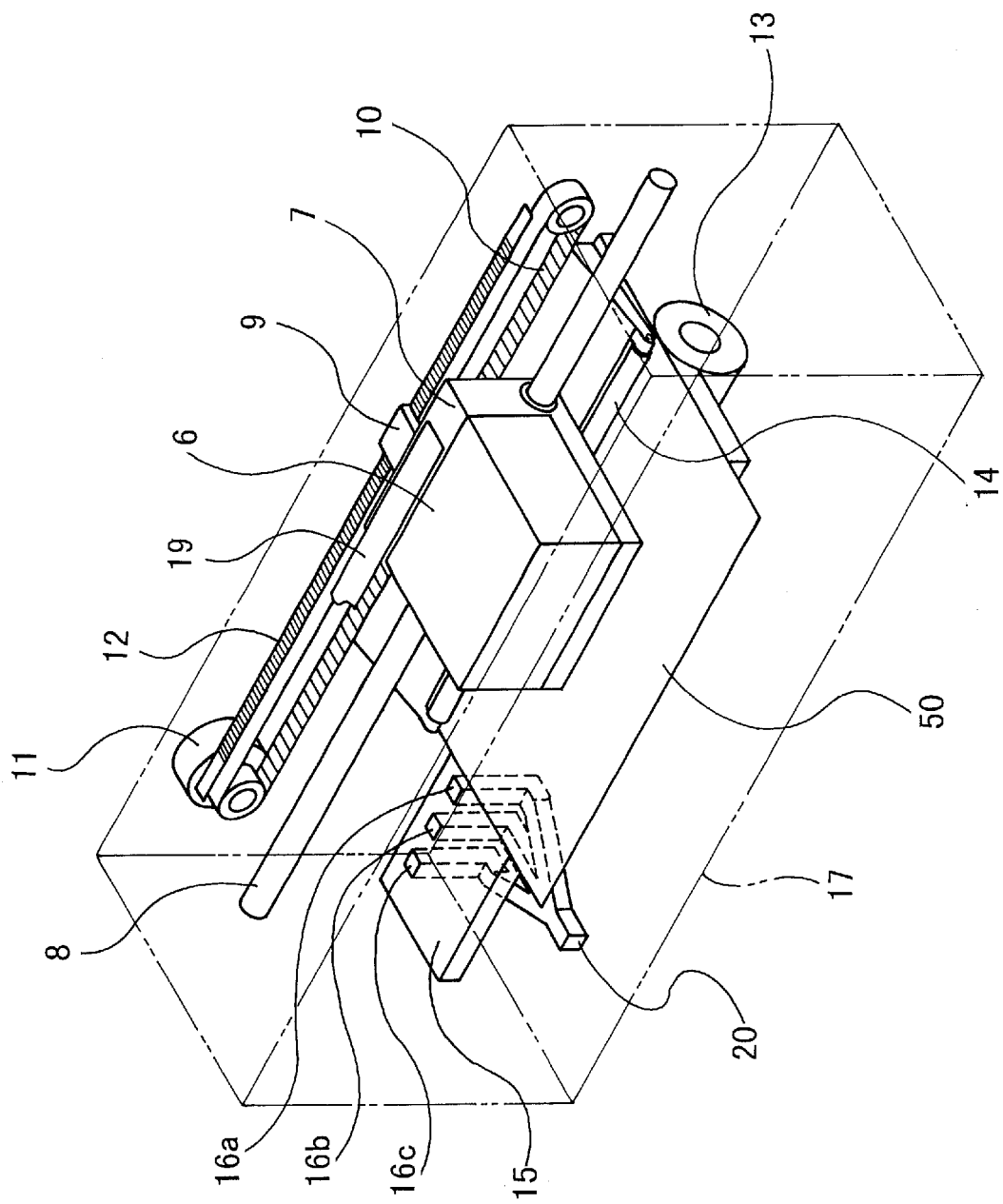
FIG. 9 is a perspective view illustrating the inner structure of an image reading apparatus provided with another type of optical paths according to the first embodiment.

Further, in the case of providing a color indication, a multiple-input single-output light guide 20 in which a plurality of light inputs are combined together into a single light output may be employed as shown in FIG. 9. In this case, it is desirable that the branched light input parts be separated from each other by a sufficient distance so that light leaking from one light input part is prevented from entering another light input part. In a case where a large number of colors are provided for indication by using such a multiple-input single-output light guide 20, it is desirable that the branched light inputs be made of optically transparent materials having different colors and the single light output be made of a colorless and optically transparent material.

Further, the optical paths 20a, 20b and 20c are not limited to the light guide made of an acrylic resin or the like, but the optical paths may be realized into any form as long as light is perceptible through the optical paths. For example, optical paths may be realized with a combination of mirrors in such a manner that light is perceptible through such an optical path. When it is desired to provided a color indication, a color filter serving as color indication means may be disposed in the middle of the optical path at a proper location on the input side.

Incidentally, when it is required to change the color of the light emitted from the light source 1, the color may be changed under the control of the CPU 40.

(Third Embodiment)

A third embodiment of an image reading apparatus according to the present invention is described below. In the image reading apparatus of the third embodiment, as shown in FIG. 10, an original is placed at a fixed position without being moved, and a light emitting element with a sufficiently large length to illuminate the original over the entire width is moved in a direction along the length of the original, thereby reading an image recorded on the original (this type of image reading apparatus is called a flatbed type of image reading apparatus).

In the flatbed type of image reading apparatus, there is provided a supporting glass plate 115 for supporting the original 150 thereon while maintaining the original 150 a constant distance apart from a reading head scanning part 107. A cover 118 is arranged to cover the original 150 so that the original 150 is not illuminated with external light. The reading head scanning part 107 uniformly illuminates the surface of the original 150 with light emitted by a light emitting element 101 having a length equal to the width of the original 150 and disposed in a direction across the entire width of the original 150. Then, the reading head scanning part 107 is moved along a guide shaft 108 in a direction of the length of the original 150, thereby reading an image recorded on the original 150.

The supporting glass plate 115 is provided with a plurality of equally spaced holes 116a, 116b and 116c formed at locations opposed to the light emitting element 101 of the reading head scanning part 107 and in an area within the range in which the reading head scanning part 107 is movable but outside the area in which the original 150 is placed. One end of each of the light guides 120a, 120b and 120c serving as an optical path is inserted into a corresponding one of the holes 116a, 116b and 116c. These light guides may be made of a colorless and optically transparent material such as an acrylic resin. The light guides 120a, 120b and 120c are apart from each other by a sufficient distance so that when one light guide is illuminated with the light emitted from the light emitting element 101, light leaking from that light guide is prevented from entering another light guide.

Figure 10:
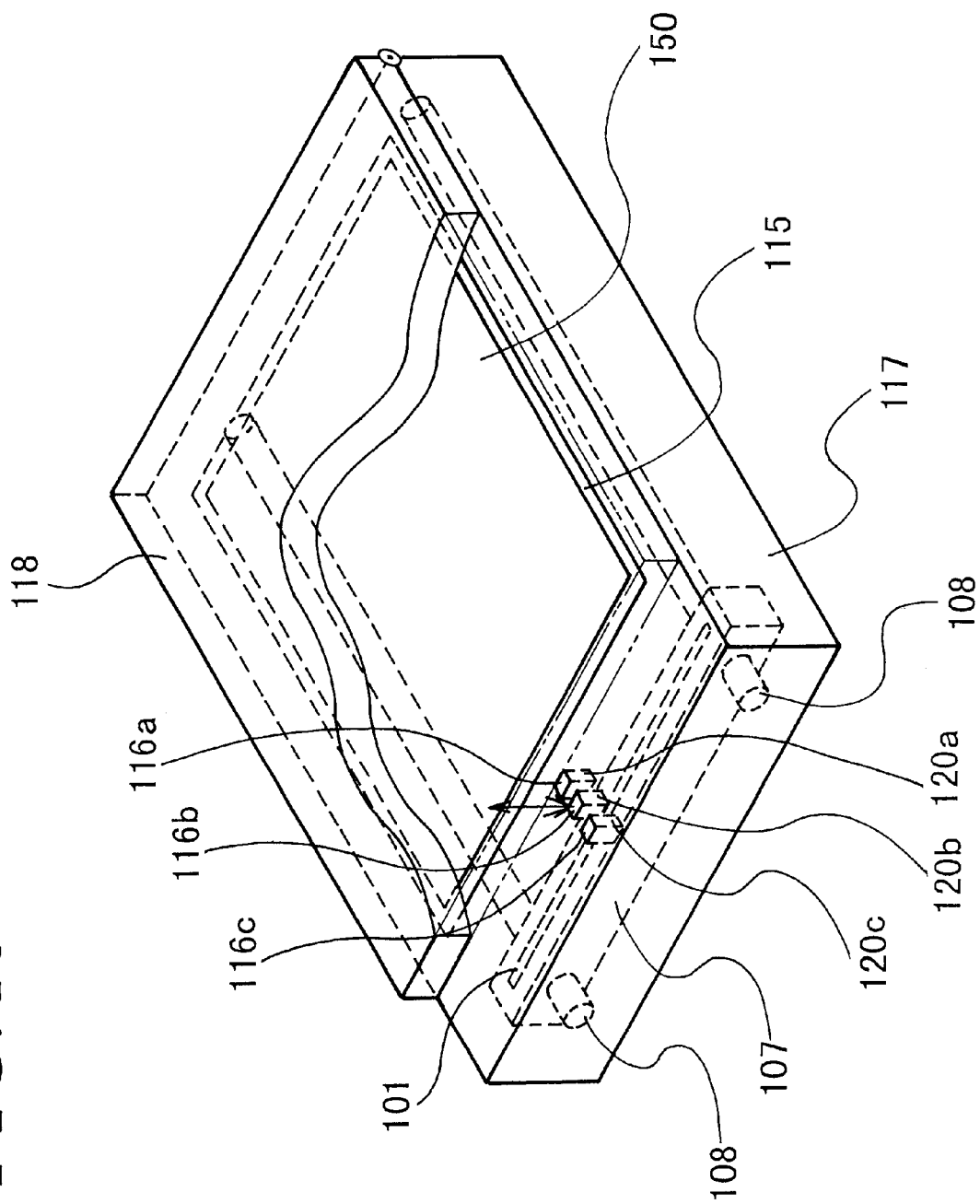
FIG. 10 is a perspective view illustrating the outer structure of an image reading apparatus according to a third embodiment of the invention.

As shown in FIG. 10, the light guides 120a, 102b and 120c extend up to an exterior part 117 of the body of the image reading apparatus. In the above structure, one of the light guides 120a, 120b and 120c is selected depending on a position at which the reading head scanning part 107 is at rest, and the light emitted from the light emitting element 101 of the reading head scanning part 107 is guided through the selected light guide to the outside so that the external end of the selected light guide is illuminated, thereby indicating the status of the image reading apparatus.

Figure 11:
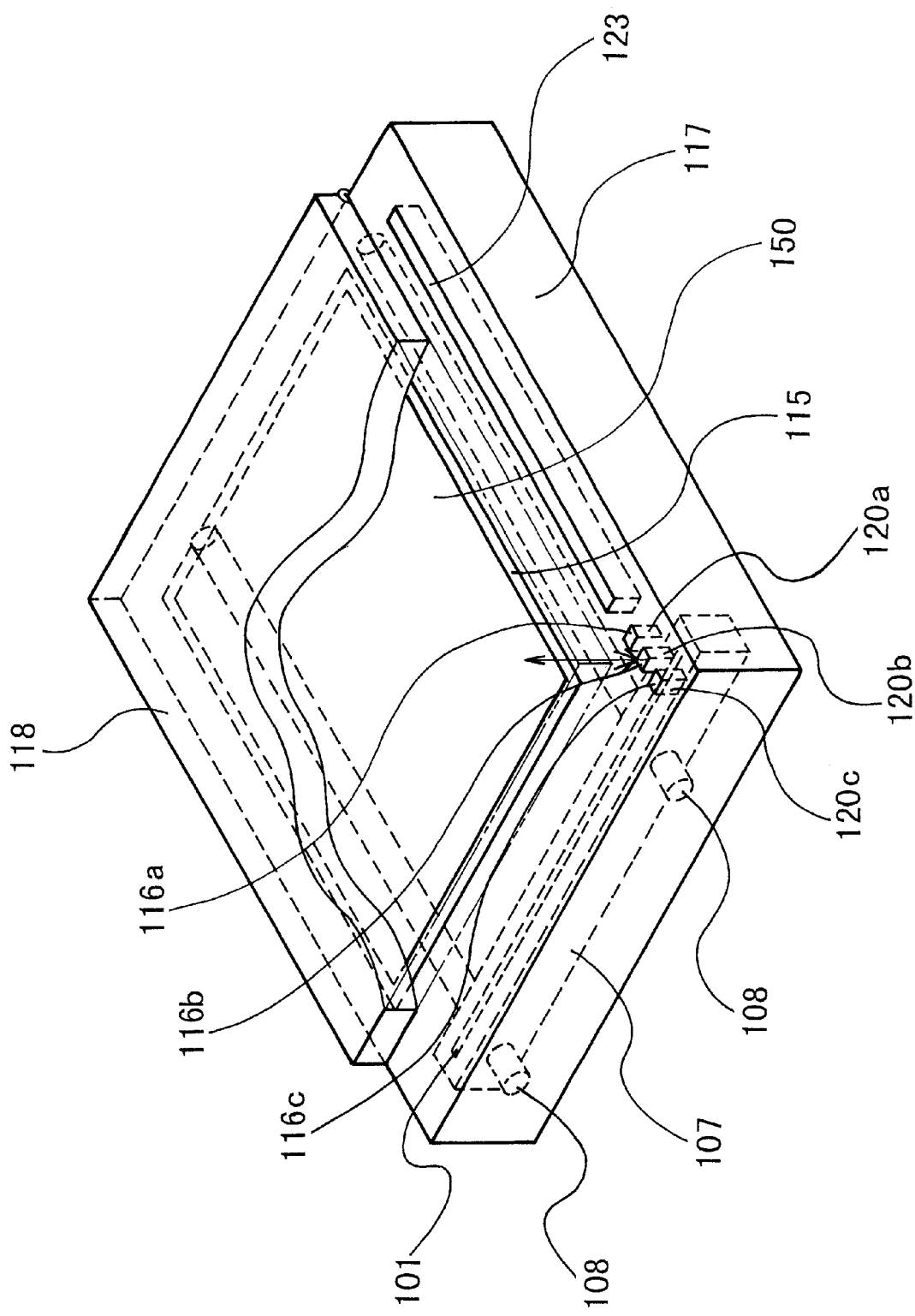
FIG. 11 is a perspective view illustrating the outer structure of another image reading apparatus according to the third embodiment of the invention.

Further, if the light emitting element 101 of the reading head scanning part 107 is adapted to have a length slightly grater than the width of the original 150, as shown in FIG. 11, then it becomes possible to also indicate the status during the scanning and reading operation by using a light guide 123.

The optical paths may be realized in various manners as in the first and second embodiments, although they are not described in further detail herein.

(Fourth Embodiment)

Figure 12:
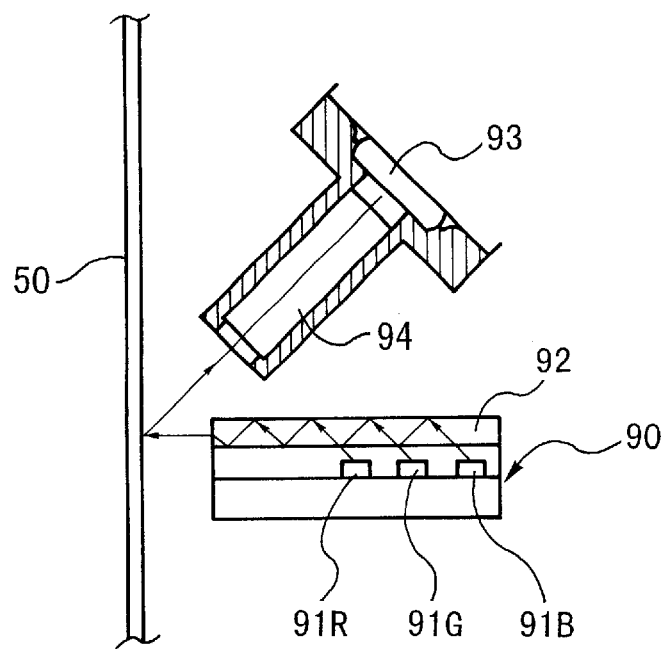
FIG. 12 is a cross-sectional view schematically illustrating the structure of a scanner head provided in an image reading apparatus according to a fourth embodiment of the invention.
Figure 13:
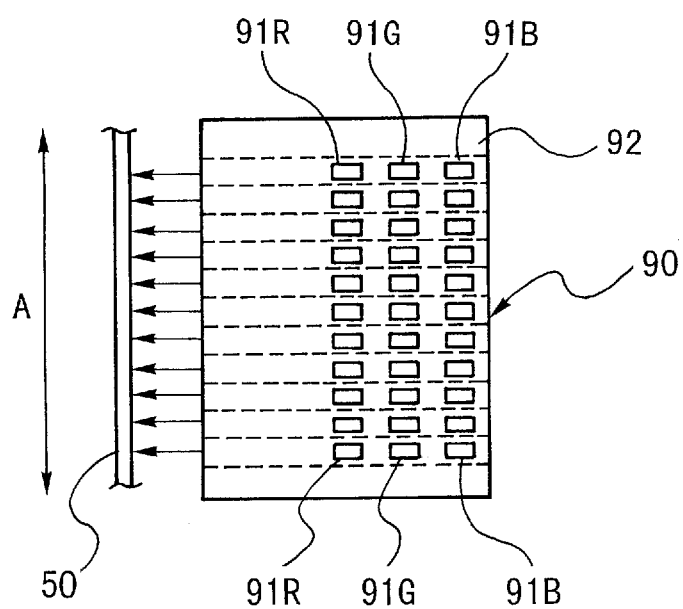
FIG. 13 is a cross-sectional view schematically illustrating the structure of the scanner head provided in the image reading apparatus according to the fourth embodiment.
Figure 14:
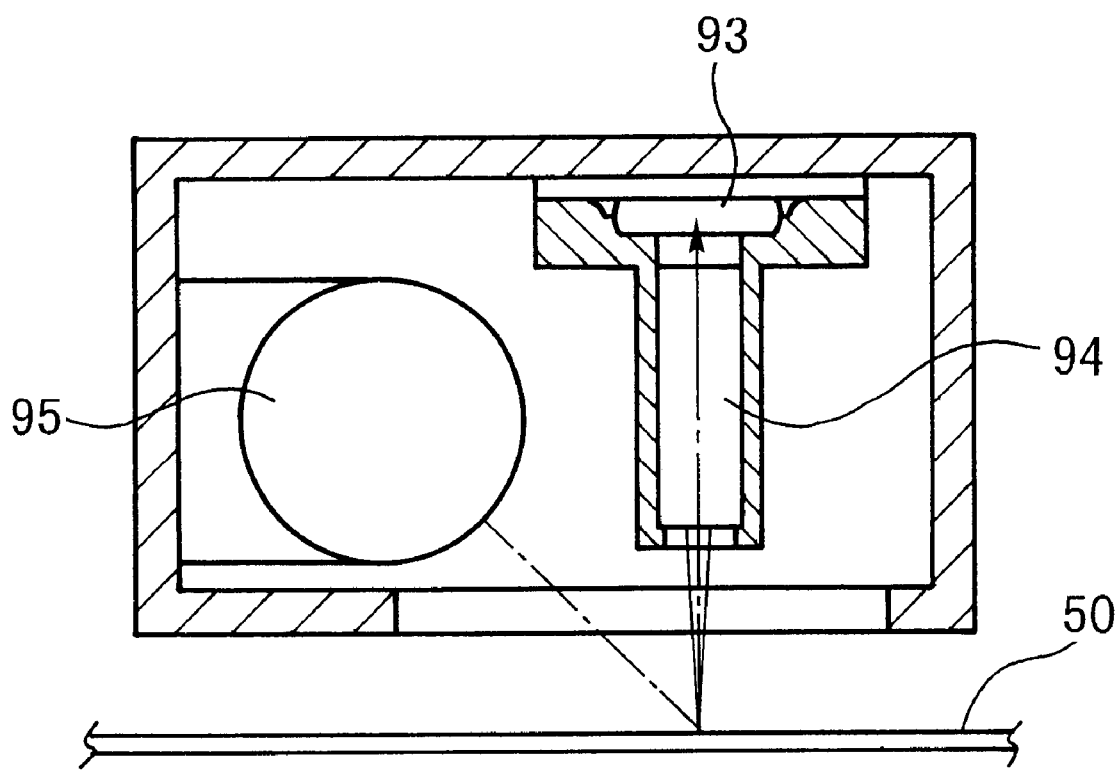
FIG. 14 is a cross-sectional view illustrating the structure of a scanner head of the conventional line-illumination-type image reading apparatus.

A fourth embodiment of an image reading apparatus according to the present invention is described below. In the fourth embodiment, as shown in FIG. 12, the invention is applied to a line-illumination-type image reading apparatus in which an original is illuminated with light simultaneously along a line extending in a direction across the width of the original, which direction is perpendicular to a direction in which to transport the original (i.e, which direction is perpendicular to the paper surface of FIG. 12 or parallel to the direction denoted by an arrow A in FIG. 13).

As the light source (illumination means or light radiating means) 90, there are used three kinds of light emitting diodes (LEDs) 91R, 91G and 91B having different spectral characteristics for emitting blue, green, and red light, respectively. In the light source 90, there are arranged, along the width of the original, a plurality of groups of light emitting elements, wherein each group is composed of the three kinds of light emitting diodes 91R, 91G and 91B (refer to FIG. 13). The light source 90 further includes an optical waveguide 92 for guiding the light emitted from each of the light emitting diodes 91R, 91G and 91B to the original in such a manner that the three kinds of light emitting diodes 91R, 91G and 91B produce the same illumination field on the original. The length along which the groups of three types of light emitting diodes 91R, 91G, and 91B are arranged in the original width direction is selected to have a value large enough to read an image of an original of a rather large size such as an A3-size original.

It is required that the intensity of the light emitted by the light source 90 should be sufficiently high so that an image sensor 93 can read the image light which is reflected from the original 50 illuminated by the light source 90 and which is incident on the image sensor 93 through a condensing lens 94. The high intensity of the light may be achieved by arranging a plurality of groups of light emitting diodes 91R, 91G, and 91B along a plane opposed to the surface of the original, or by increasing the arrangement density of the groups of light emitting diodes 91R, 91G and 91B in the original width direction, or otherwise by reducing the space between the optical waveguide 92 and the original 50.

In the line-illumination-type image reading apparatus according to the fourth embodiment, the original may be placed at a fixed position and scanned by moving a reading means composed of the light source 90, the image sensor 93, etc., or instead, with the reading means disposed at a fixed location, the scanning and reading operation may be accomplished by moving the original.

In the fourth embodiment, as described above, the line-illumination-type light source is realized by disposing a plurality of groups of light emitting diodes, each group being composed of three kinds of light emitting diodes 91R, 91G and 91B for emitting blue, green, and red light, respectively, in the original width direction. This arrangement makes it possible to realize a high-performance light source having a reduced size and consuming less electric power, which is capable of providing good light intensity balance and also good color balance.

What is claimed is:

1. An image reading apparatus comprising:
   (a) a light source for illuminating an original;
   (b) reading means for reading light from the original illuminated by said light source; and
   (c) an indication part for indicating an operating status of the apparatus by using illumination light emitted from said light source.

2. An image reading apparatus according to claim 1, further comprising an optical path for guiding light emitted from said light source to said indication part.

3. An image reading apparatus according to claim 2, wherein said optical path includes a plurality of optical paths.

4. An image reading apparatus according to claim 3, further comprising control means for controlling the apparatus such that one of said plurality of optical paths is selected and illumination light emitted from said light source is guided through the selected optical path to an exterior part of the apparatus.

5. An image reading apparatus according to claim 3, wherein said plurality of optical paths are disposed apart from each other by a distance which is sufficient to prevent light leaking from one optical path from entering another optical path.

6. An image reading apparatus according to claim 3, wherein said plurality of optical paths include color indication means for indicating different colors, and said light source emits monochromatic light.

7. An image reading apparatus according to claim 3, wherein said plurality of optical paths constitute a multiple-input single-output optical path which is composed of a plurality of light input parts and a single light output part formed by combining optical paths from the plurality of light input parts into one optical path.

8. An image reading apparatus according to claim 7, wherein the plurality of light input parts of said multiple-input single-output optical path include color indication means for indicating different colors, and said light source emits monochromatic light.

9. An image reading apparatus according to claim 1, further comprising moving means for relatively moving the original and said light source.

10. An image reading apparatus according to claim 1, further comprising transport means for transporting the original.

11. An image reading apparatus according to claim 1, further comprising holding means for holding said reading means.

12. An image reading apparatus according to claim 11, wherein said holding means holds one of said reading means and printing means in such a manner that said reading means and said printing means can be exchanged with each other.

13. An image reading apparatus according to claim 11, further comprising transport means for transporting the original, and moving means for moving said holding means in a direction perpendicular to a direction in which the original is transported by said transport means.

14. An image reading apparatus according to claim 1, wherein said light source is arranged to emit color light with three primary colors, and further comprising changing means for changing color of light emitted from said light source, depending on an operating status of said reading means.

* * * * *